United States Patent [19]

Käfer et al.

[11] 4,404,351

[45] Sep. 13, 1983

[54] PROCESS FOR THE ISOLATION OF POLYCARBONATES BASED ON 4,4′-DIHYDROXYDIPHENYL SULPHONES

[75] Inventors: Peter Käfer, Krefeld; Leo Morbitzer, Cologne; Dieter Neuray, Krefeld; Wolfgang Cohnen, Leverkusen; Werner Nouvertne, Krefeld, all of Fed. Rep. of Germany

[73] Assignee: Bayer Aktiengesellschaft, Leverkusen, Fed. Rep. of Germany

[21] Appl. No.: 420,438

[22] Filed: Sep. 20, 1982

[30] Foreign Application Priority Data

Sep. 25, 1981 [DE] Fed. Rep. of Germany ....... 3138179

[51] Int. Cl.³ .............................................. C08G 63/62
[52] U.S. Cl. .................................... 528/174; 528/126; 528/128; 528/171
[58] Field of Search ................. 528/173, 174, 125–128, 528/171

[56] References Cited

U.S. PATENT DOCUMENTS

| | | | |
|---|---|---|---|
| 3,271,364 | 9/1966 | Conix et al. | 260/47 |
| 3,271,367 | 9/1966 | Schnell et al. | 260/49 |
| 3,312,659 | 4/1967 | Kurkjy et al. | 260/47 |
| 3,312,662 | 4/1967 | Kurkjy et al. | 260/47 |
| 3,419,526 | 12/1968 | Schnell et al. | 260/49 |
| 3,737,409 | 6/1973 | Fox | 528/174 |
| 3,879,347 | 4/1975 | Serini et al. | 528/174 |
| 3,912,688 | 10/1975 | Schiller et al. | 528/174 |
| 3,974,126 | 8/1976 | Narita et al. | 528/174 |
| 3,974,127 | 8/1976 | Tanikella et al. | 528/174 |
| 4,299,948 | 11/1981 | Weirauch et al. | 528/174 |

FOREIGN PATENT DOCUMENTS 547 2/1979 European Pat. Off.

*Primary Examiner*—Lester L. Lee
*Attorney, Agent, or Firm*—Gene Harsh; Lawrence S. Pope; Aron Preis

[57] ABSTRACT

The present invention relates to a process for the isolation of polycarbonates containing 18 to 45 mol % of structural units consisting of sulphone-bisphenols, characterized in that the sulphone-bisphenols are subjected to a polycondensation reaction with oligocarbonates containing chloroformic acid ester end groups, the phases are separated, the organic phase is purified and the sulphone-bisphenol polycarbonates are isolated.

6 Claims, No Drawings

PROCESS FOR THE ISOLATION OF POLYCARBONATES BASED ON 4,4'-DIHYDROXYDIPHENYL SULPHONES

The present invention relates to a process for the isolation of polycarbonates containing 18 to 45 mol %, preferably 22–40 mol %, of structural units of the formula Ia

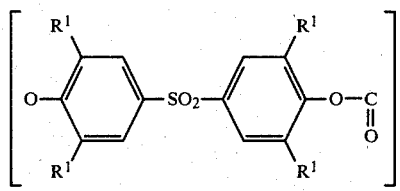

in which $R^1 = H$ or $C_1$–$C_3$-alkyl, relative to the sum of polycarbonate structural units of the formulae I+Ia,

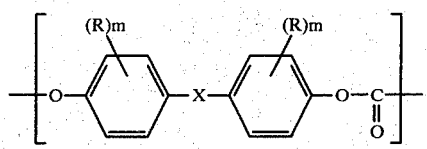

X being a bond, $C_1$–$C_8$-alkylene, $C_2$–$C_8$-alkylidene, cyclohexylene, cyclohexylidene, S, O or CO R being hydrogen, chlorine, bromine or alkyl substituents having 1 to 3 C atoms and m being 0, 1 or 2, in I, by reacting 18 to 45 mol %, preferably 20–40 mol %, of sulphone-bisphenols of the formula IIa

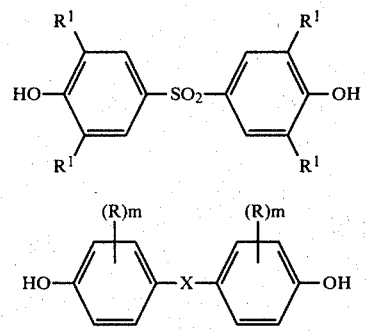

with 82 to 55 mol %, preferably 78 to 60 mol %, of bisphenols of the formula II, in each case relative to the total molar amount of the bisphenols IIa+II used, by the phase-boundary process, characterised in that the bisphenols of the formula II are phosgenated to give an oligocarbonate containing chloroformic acid ester end groups, by phosgenation in a phase mixture of an aqueous alkaline phase and an inert organic phase, and the oligocarbonate is then polymerised with the sulphone-bisphenols of the formula IIa using an amine catalyst, the phases are separated in a known separating vessel after the polycondensation has ended, and the organic phase is washed with phosphoric acid and water in the customary manner, until the washings are neutral, and, after further separation of the phases, the sulphone-bisphenol polycarbonates are isolated by precipitation or evaporation of the organic solvent.

The meaning of $R^1$, R, X and m in the formulae II and IIa corresponds to that in the formulae I and Ia.

The preparation of sulphone-containing polycarbonates has been known for a long time (see U.S. Pat. No. 3,271,367 [Ue 1695], DE-AS [German Published Specification ] No. 1,007,996[Ue 1695], U.S. Pat. No. 3,271,364, U.S. Pat. No. 3,312,659, U.S. Pat. No. 3,312,662 and U.S. Pat. No. 3,419,526 [Le A 10 078].

In cases where this process involves the method of phase-boundary polycondensation, problems arise, for contents of more than 15 mol % of sulphone-bisphenols, with the phase separation and isolation of the sulphone polycarbonates prepared. This is also true if the bischloroformic acid esters of the sulphone-bisphenols are used in the phase-boundary process (see, for example, U.S. Pat. No. 3,271,367).

Thus, either it was necessary to turn to anhydrous processes (see U.S. Pat. No. 3,312,659 or U.S. Pat. No. 3,312,662) or it was possible, de facto, to co-condense a maximum of only about 15 mol % of sulphone-bisphenols (see, for example, U.S. Pat No. 3,912,688 [Le A 13 804] and EU-OS [European Published Specification] No. 547 [Mo 1741-EP]).

In U.S. Pat. No. 3,947,127 or French Patent Specification No. 2,235,150, a continuous process is described for the preparation of polycarbonates by the phase-boundary process, chloroformic acid esters of oligocarbonates being reacted with diphenols under special reaction conditions. Bis-(4-hydroxyphenyl) sulphone can take part in the reaction as one of several diphenols, either in the form of the oligocarbonate or as a diphenol component. Concrete examples of embodiments involving sulphone-bisphenol are not contained in U.S. Pat. No. 3,974,126.

Surprisingly, it was then shown that the advantage, according to the invention, of the easy isolation of the sulphone-bisphenol polycarbonates is only obtained when the bisphenols of the formula II, but not sulphone-bisphenol, are converted to oligocarbonates beforehand. The discovery of this selective behaviour was surprising in view of the teaching of U.S. Pat. No. 3,974,126.

The sulphone copolycarbonates according to the invention are distinguished by an outstanding resistance to petrol, a high heat distortion point and good mechanical properties.

The particular range of 18–45 mol % of sulphone units is of industrial value because the beneficial effects which are caused by the sulphone group, for example a high heat distortion point and good stress cracking characteristics in respect of petrol, are clearly observable, whilst the disadvantages which become evident at higher sulphone contents, for example instability towards hydrolyses and poor flow characteristics, do not yet have a detrimental effect.

The copolycarbonates prepared in this way have an average weight-average molecular weight $M_w$ of 10,000 to 200,000, preferably 20,000 to 80,000, and have the structural formula:

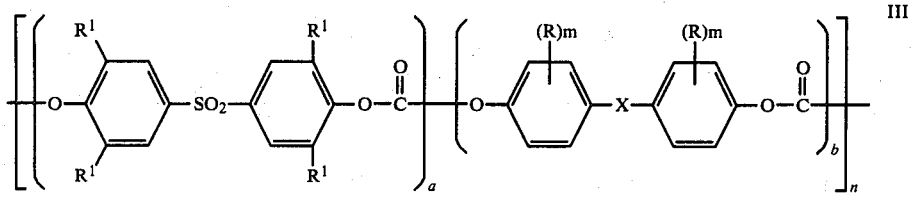

in which

X, R, $R^1$ and m have the meaning given for I or Ia, the ratio b:a can be about 4.5:1 to 1.2:1 and n can take values of 5–160.

The bisphenols of the formula II suitable for the preparation of the copolycarbonates of the formula III are 4,4-dihydroxydiphenyls, bis-(4-hydroxyphenyl)-$C_1$-$C_8$-alkanes, bis-(4-hydroxyphenyl)-cyclohexanes, bis-(4-hydroxyphenyl) sulphides, ethers and ketones, and also compounds which are ($C_1$-$C_3$)-alkylated and/or brominated and/or chlorinated on the nucleus.

These and further suitable bisphenols II are described, for example, in U.S. Pat. Nos. 3,028,365, 2,999,835, 3,148,172, 2,991,273, 3,271,367 and 2,999,846, in German Offenlegungsschriften (German Published Specification) Nos. 1,507,703, 2,063,050, 2,063,052, 2,211,956 and 2,211,957, in French Patent Specification No. 1,561,518 and in the monograph "H. Schnell, Chemistry and Physics of Polycarbonates, Interscience Publishers, New York, 1964".

Examples of preferred bisphenols of the formula II are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, 1,1-bis(4-hydroxyphenyl)-propane and 1,1-bis-(4-hydroxyphenyl)-butane.

2,2-bis-(4-hydroxyphenyl)-propane is very particularly preferred. A suitable and at the same time preferred sulphone-bisphenol of the formula IIa is bis(4-hydroxyphenyl) sulphone.

Furthermore, the polycarbonates can be branched by the incorporation of small amounts, preferably amounts of between 0.05 and 2.0 mol % (relative to the diphenols used), of trifunctional and more than trifunctional compounds, in particular those having three or more than three phenolic hydroxyl groups.

Polycarbonates of this type are described, for example, in German Offenlegungsschriften (German Published Specification) Nos. 1,570,533, 1,595,762, 2,116,974, 2,113,347 and 2,500,092, British Patent Specification No. 1,079,821 and U.S. Pat. No. 3,544,514.

The conditions of the phase-boundary process are known, for example, from "Schnell, loc-cit.". Preferred solvents are chlorobenzene and $CH_2Cl_2$ and also mixtures thereof.

Suitable amine catalysts are the customary amine catalysts such as, for example, triethylamine or N-methylpiperidine; likewise, chain stoppers are the customary chain stoppers such as for example (alkyl and or halogen) phenols. Reaction temperatures, times and pressures and also the basicity of the reaction medium are to be adjusted in the customary manner. The amount of phosgene to be used is preferably 1.2 to about 2 mols per molar sum of II+IIa.

The chloroformic acid esters of the bisphenols II, to be prepared first, have average degrees of polymerisation of up to 1–8 of the structural units I and can be prepared in a known manner.

The phase separation is carried out in the customary separating vessels, which are familiar to those skilled in the art, used for the preparation of bisphenol-A homopolycarbonates.

The isolation of the sulphone-bisphenol polycarbonates by precipitation is carried out by using petroleum ether, alkanes, methanol or acetone as precipitating agents.

The evaporation of the solvent can be carried out in the customary manner by means of known vented extruders.

The preparation, purification and working-up of the organic phase containing polycarbonate thus presents no difficulties. The sulphone-bisphenol polycarbonates can be isolated and obtained as granules, sheets or strands.

The copolycarbonates are used as mouldings wherever a high heat resistance and good stress cracking characteristics, in particular in respect of petrol, are required.

As is customary, additives of all kinds can be added to the polycarbonates according to the invention, during or after the preparation process. Examples which may be mentioned in this context are dyestuffs, pigments, mould-release agents, stabilisers against the action of moisture, heat and UV, lubricants, fillers such as powdered glass, quartz products, graphite, molybdenum sulphide, powdered metal, powder of higher-melting plastics, for example polytetrafluroethylene powder, natural fibres such as cotton, sisal and asbestos, and also a very wide variety of glass fibres, metal filaments, and fibres which are stable during the residence time of the polycarbonates in the melt and which do not noticeably damage the polycarbonates.

The petrol resistance of the polycarbonate moulding compositions is tested by storing the appropriate mouldings, for example standard small test-bars which are under a defined tension predetermined by a particular extension, in test media. The test medium used is a mixture of toluene/isooctane in a volume ratio of 1:1. The test-pieces, which have a strain of 0.6%, are stored in the test medium for one hour. The products are then assessed visually in respect of breaks, crack formation and discolouration.

The examples which follow are intended to illustrate the subject of the invention in greater detail. The relative solution viscosities given are measured in methylene chloride at 25° C. and a concentration of 5 g/liter.

COMPARISION EXAMPLE 1

Preparation of a branched copolycarbonate of bisphenol A and 4,4′-dihydroxydiphenylene sulphone (molar ratio 80:20), by joint phosgenation at the phase-boundary.

2.554 kg of bisphenol A, 0.701 kg of 4,4′-dihydroxydiphenylene sulphone, 24.2 g of isatin-bis-cresol, 42.2 g of phenol, 3 kg of 45% strength sodium hydroxide solution, 35 kg of water and 36.2 kg of methylene chloride are introduced into a 100 liter kettle. The kettle is flushed with nitrogen. 2.22 kg of phosgene are then introduced, at room temperature, over a period of one hour, the pH value being kept at 12-13 by the addition of 45% strength NoOH. After the addition of 8.5 g of triethylamine, the mixture is stirred for a further 15 minutes.

The product is introduced into a separator, in which only an incomplete phase separation takes place because of emulsion formation. The organic phase is separated off as far as possible, acidifed with phosphoric acid and washed several times with distilled water. Even in an acid or neutral medium, only an incomplete phase separation takes place. The polycarbonate obtained in this way is extruded and granulated. The yield and properties of the product are given in the table.

COMPARISION EXAMPLE 2

Preparation of an unbranched copolycarbonate of bisphenol A and 4,4'-dihydroxydiphenyl sulphone (molar ratio 65-35), by joint phosgenation at the phase-boundary.

The procedure is analogous to Example 1, 2.078 kg of bisphenol A, 1.226 kg of 4,4'-dihydroxydiphenylene sulphone and 45.2 g of p-tert.-butylphenol being used. In this case too, there are considerable separation problems in an alkaline, acid or neutral medium. The yield and properties of the product are given in the table.

EXAMPLE 3

Preparation of a branched copolycarbonate of bisphenol A and 4,4'-dihydroxydiphenyl sulphone (molar ratio 80:20), by the addition of 4,4'-dihydroxydiphenyl sulphone to previously phosgenated bisphenol A.

2.554 kg of bisphenol A, 24.2 g of isatin-biscresol, 42.2 g of phenol, 31.9 g of triethylbenzylammonium chloride, 2.4 kg of 45% strength sodium hydroxide solution, 27.7 liters of water and 36.2 kg of methylene chloride are introduced into a 100 liter kettle. The kettle is flushed with nitrogen. 4.4 kg of phosgene are then introduced, at room temperature, over a period of 1.5 hours, the pH value being kept at 12 by the addition of 45% strength NaOH. A solution of 0.701 kg of 4,4'-dihydroxydiphenylene sulphone in 1.035 kg of 45% strength sodium hydroxide solution and 12.1 liters of water is then pumped in. After the addition of 8.5 g of triethylamine, the mixture is stirred for a further 15 minutes. The product is introduced into a separator. The phases can be separated without problems, no emulsion formation taking place. The organic phase is separated off, acidified with phosphoric acid and washed several times with distilled water. Even in an acid or neutral medium, a complete and unproblematic phase separation takes place. The polycarbonate obtained in this way is extruded and granulated. The yield and properties are given in the table.

EXAMPLE 4

Preparation of an unbranched copolycarbonate of bisphenol A and 4,4'-dihydroxydiphenylene sulphone (molar ratio 65:35), by the addition of 4,4'-dihydroxydiphenylene sulphone to bisphenol A bis-chloroformate.

2.755 kg of bisphenol A bis-chloroformate, 31.4 kg of methylene chloride, 19.3 liters of water and 38.7 liters of p-tert.-butylphenol are introduced into a 100 liter kettle. The kettle is flushed with nitrogen. A solution of 1.051 kg of dihydroxydiphenylene sulphone in 0.887 kg of 45% strength sodium hydroxide solution and 10.4 liters of water is then pumped in. After the addition of 7.3 g of triethylamine, the mixture is stirred for a further 15 minutes. In this process, a pH value of 12 is maintained by the addition of 45% strength sodium hydroxide solution.

The product is introduced into a separator. The phases can be separated without problems, no emulsion formation taking place. The organic phase is separated off, acidified with phosphoric acid and washed several times with distilled water. Even in an acid or neutral medium, a complete and unproblematic phase separation takes place. The polycarbonate obtained in this way is extruded and granulated. The yield and properties are given in the table. Comparison Example according to U.S. Pat. No. 3,974,126:

Preparation of a branched copolycarbonate of bisphenol A and 4,4'-dihydroxydiphenylene sulphone (molar ratio 80:20) by the addition of 20 molar parts of bisphenol A to previously phosgenated bisphenol A and 4,4'-dihydroxydiphenylene sulphone.

The procedure is analogous to Example 3, 1.918 kg of bisphenol A and 0.701 kg of 4,4'-dihydroxydiphenylene sulphone being phosgenated beforehand. A solution of 0.639 kg, bisphenol-A and 12.1 liters of water is added to the previously phosgenated mixture. In this case too, there are considerable separation problems in an alkaline, acid or neutral medium, together with an incomplete incorporation of the 4,4'-dihydroxydiphenylene sulphone into the polycarbonate. The yields and properties of the product are given in the table.

TABLE 1

| | Yield (% of theory) | η rel. | S (% found/ theoretical) | Vicat B (°C.) | Notched impact strength kJ/m², room temperature |
|---|---|---|---|---|---|
| Example 1 (comparison example) | 55 | 1.30 | 1.8/2.5 | 160 | 43 |
| Example 2 (comparison example) | 46 | 1.25 | 2.8/4.3 | 165 | 36 |
| Example 3 | 91 | 1.32 | 2.4/2.5 | 164 | 40 |
| Example 4 | 93 | 1.28 | 4.1/4.3 | 173 | 33 |
| Comparison example | 60 | 1.31 | 1.7/2.5 | 159 | 42 |

We claim:

1. A process for the isolation of a polycarbonate containing 18 to 45 mol % of structural units of the general formula

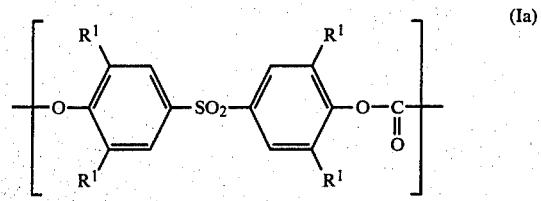

(Ia)

in which
R¹ denotes a hydrogen atom or a $C_1$ to $C_3$ alkyl group, relative to the sum of polycarbonate structural units of the formula (I)+(Ia) in a polycarbonate of the general formula

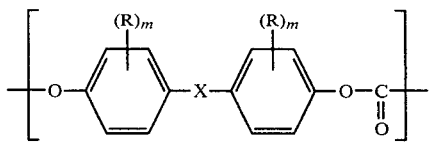

in which

X denotes a direct bond, a $C_1$ to $C_8$ alkylene, $C_2$ to $C_8$ alkylidene, cyclohexylene or cyclohexylidene radical, S, O or CO, each R independently denotes a hydrogen, chlorine or bromine atom or an alkyl group having 1 to 3 carbon atoms, and m is 0, 1 or 2, comprising reacting, by the phase-boundary process, 18 to 45 mol % of a sulphone-bisphenol of the general formula

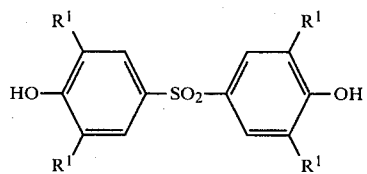

in which $R^1$ has the meaning given above, with 82 to 55 mol % of a bisphenol of the general formula

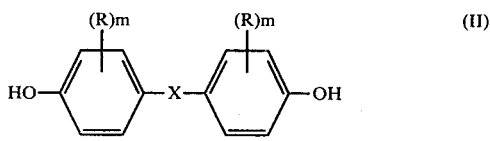

in which X, R and m have the meanings given above, said mol percentages in each case being relative to the total molar amount of the bisphenols of formula (IIA)+(II) used, in which reaction the bisphenol of the formula (II) is phosgenated to give an oligocarbonate containing chloroformic acid ester end groups and the oligocarbonate is then subjected to a polycondensation reaction with the sulphone-bisphenols of the formula (IIa) using an amine catalyst, separation of the phases in a separating vessel after the polycondensation has ended, and washing of the organic phase with phosphoric acid and water until the washings are neutral, and after further separation of the phases, isolation of the sulphone-bisphenol polycarbonate by precipitation or evaporation of the organic solvent.

2. The process of claim 1 wherein about 22 to about 40 mol % of said sulphone-bisphenol of formula (IIa) are reacted with about 78 to about 60 mol % of said bisphenols for formula (II).

3. The process of claim 1 or 2 wherein the bisphenol of formula (II) is selected from the group consisting of 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)propane, 2,2-bis-(3,5-dibromo-4-hydroxyphenyl)-propane, 1,1-bis-(4-hydroxyphenyl)-cyclohexane, 1,1-bis-(4-hydroxyphenyl)-propane and 1,1-bis-(4-hydroxyphenyl)-butane.

4. The process of claim 3 wherein said bisphenol of formula (II) is 2,2-bis-(4-hydroxyphenyl)-propane.

5. The process of claim 1 or 2 wherein said sulphonebisphenol of formula (IIa) is bis-(4-hydroxyphenyl) sulphone.

6. The process of claim 1 or 2 wherein about 1.2 to 2 mols of phosgene are used per molar sum of the bisphenols of formulae (II)+(IIa).

* * * * *